(12) United States Patent
Ma et al.

(10) Patent No.: US 10,663,766 B2
(45) Date of Patent: May 26, 2020

(54) GRAPHENE-BASED PLASMONIC SLOT ELECTRO-OPTICAL MODULATOR

(71) Applicant: The George Washington University, Washington, DC (US)

(72) Inventors: Zhizhen Ma, Arlington, VA (US); Volker J. Sorger, Alexandria, VA (US)

(73) Assignee: The George Washington University, Washington, DC (US)

( * ) Notice: Subject to any disclaimer, the term of this patent is extended or adjusted under 35 U.S.C. 154(b) by 0 days.

(21) Appl. No.: 15/905,167

(22) Filed: Feb. 26, 2018

(65) Prior Publication Data

US 2018/0246350 A1 Aug. 30, 2018

Related U.S. Application Data

(60) Provisional application No. 62/463,217, filed on Feb. 24, 2017.

(51) Int. Cl.
| | | |
|---|---|---|
| *G02F 1/00* | (2006.01) | |
| *G02F 1/17* | (2019.01) | |
| *G02F 1/01* | (2006.01) | |

(52) U.S. Cl.
CPC .......... *G02F 1/0018* (2013.01); *G02F 1/0081* (2013.01); *G02F 1/011* (2013.01); *G02F 1/0107* (2013.01); *G02F 1/17* (2013.01); *G02F 1/174* (2013.01); *G02F 2201/06* (2013.01); *G02F 2202/02* (2013.01); *G02F 2202/10* (2013.01); *G02F 2202/16* (2013.01); *G02F 2203/10* (2013.01); *G02F 2203/48* (2013.01)

(58) Field of Classification Search
CPC .... G02F 1/0018; G02F 1/0081; G02F 1/0107; G02F 1/17; G02F 2203/48
See application file for complete search history.

(56) References Cited

U.S. PATENT DOCUMENTS

| | | | |
|---|---|---|---|
| 2013/0018599 A1* | 1/2013 | Peng | B82Y 15/00 702/30 |
| 2013/0143336 A1* | 6/2013 | Jain | H01L 33/0079 438/22 |
| 2014/0023321 A1* | 1/2014 | Lu | G02B 6/10 385/40 |
| 2014/0103414 A1* | 4/2014 | Koldiaev | H01L 21/845 257/296 |

(Continued)

OTHER PUBLICATIONS

Z. Ma, et al., "Two-Dimensional Material-Based Mode Confinement Engineering in Electro-Optic Modulators", IEEE Journal of Selected Topics in Quantum Electronics, vol. 23, No. 1, Jan./Feb. 2017, 8 pages.

(Continued)

*Primary Examiner* — Thomas A Hollweg
*Assistant Examiner* — Mary A El-Shammaa
(74) *Attorney, Agent, or Firm* — Blank Rome LLP

(57) ABSTRACT

An electro-optical modulator using a graphene-based plasmonic slot is disclosed. The electro-optical modulator is comprised of a substrate layer, a dielectric spacer, a graphene layer, a first metal layer, and a second metal layer. The metal layers create a plasmonic slot that modulates between a light absorptive and light transparent state depending on the application of voltage across the modulator. Two or four graphene layers may be used to reduce power consumption and the size of the modulator.

20 Claims, 13 Drawing Sheets

(56) References Cited

U.S. PATENT DOCUMENTS

| | | | | |
|---|---|---|---|---|
| 2014/0145148 A1* | 5/2014 | Lee | ................ | H01L 29/775 |
| | | | | 257/29 |
| 2014/0239257 A1* | 8/2014 | Moon | ............... | H01L 29/78684 |
| | | | | 257/29 |
| 2015/0129544 A1* | 5/2015 | Davis | ................ | B82B 1/005 |
| | | | | 216/39 |
| 2016/0300952 A1* | 10/2016 | Toriumi | .............. | H01L 29/7869 |

OTHER PUBLICATIONS

Z Ma, et al , Graphene-Based Plasmonic Slot Electro-Optic Modulator (Conference Presentation), Prof. SPIE 10106, Integrated Optics: Devices, Materials, and Technologies XXI, 1010618 (Apr. 19, 2017); doi: 10.1117/12.2253191; 1 page.

* cited by examiner

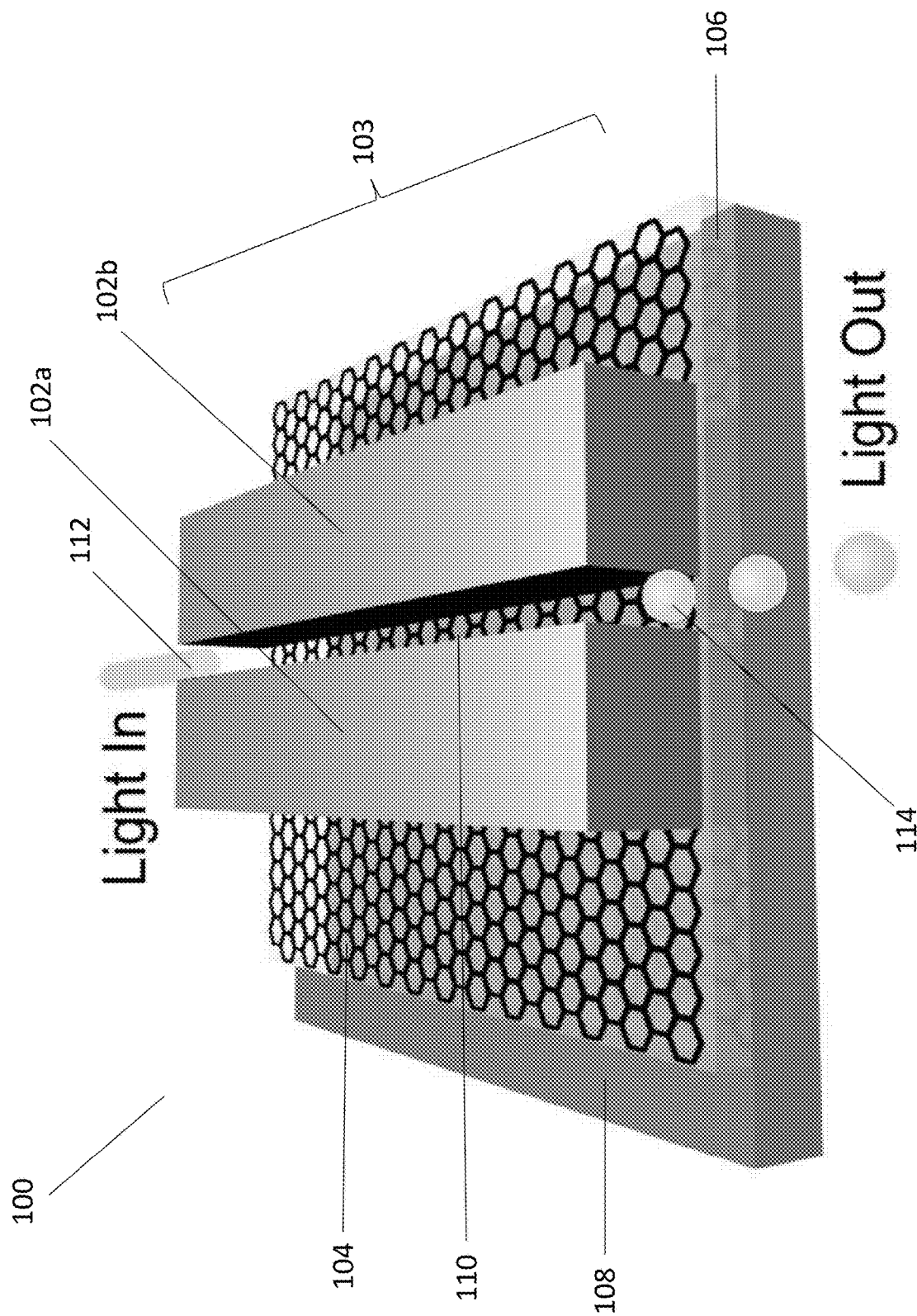

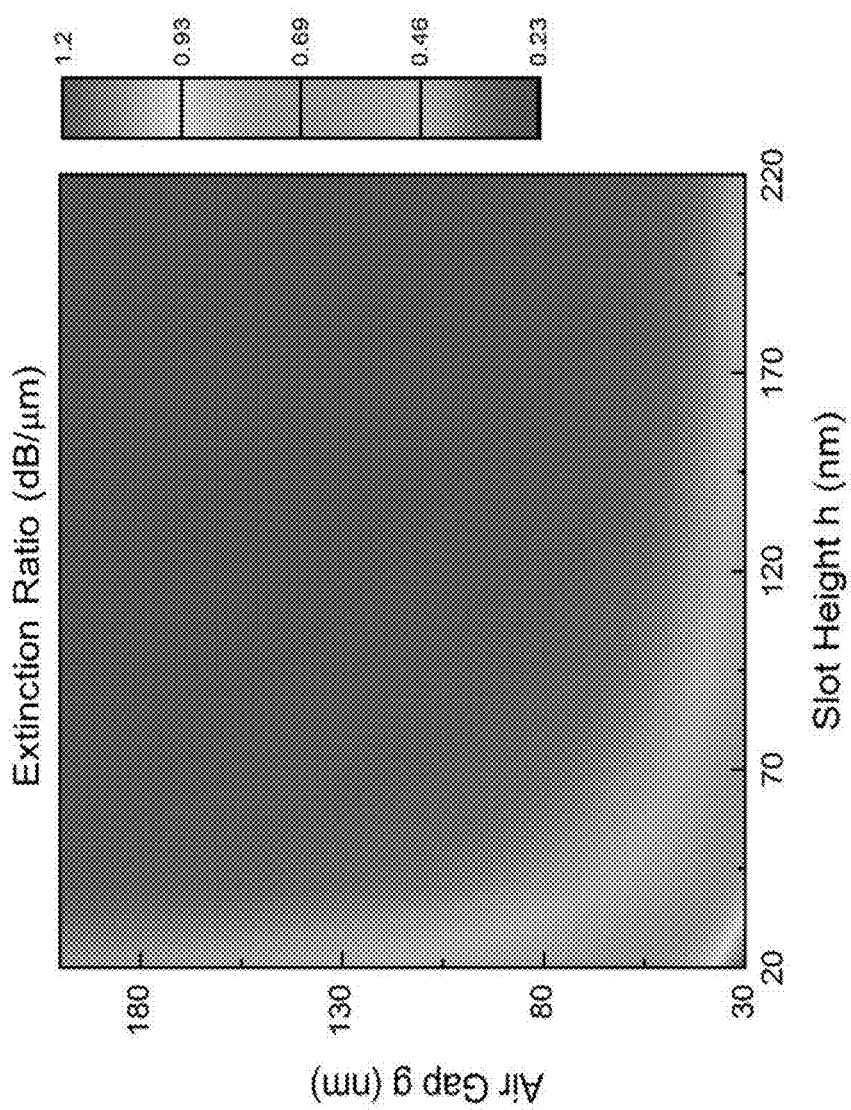

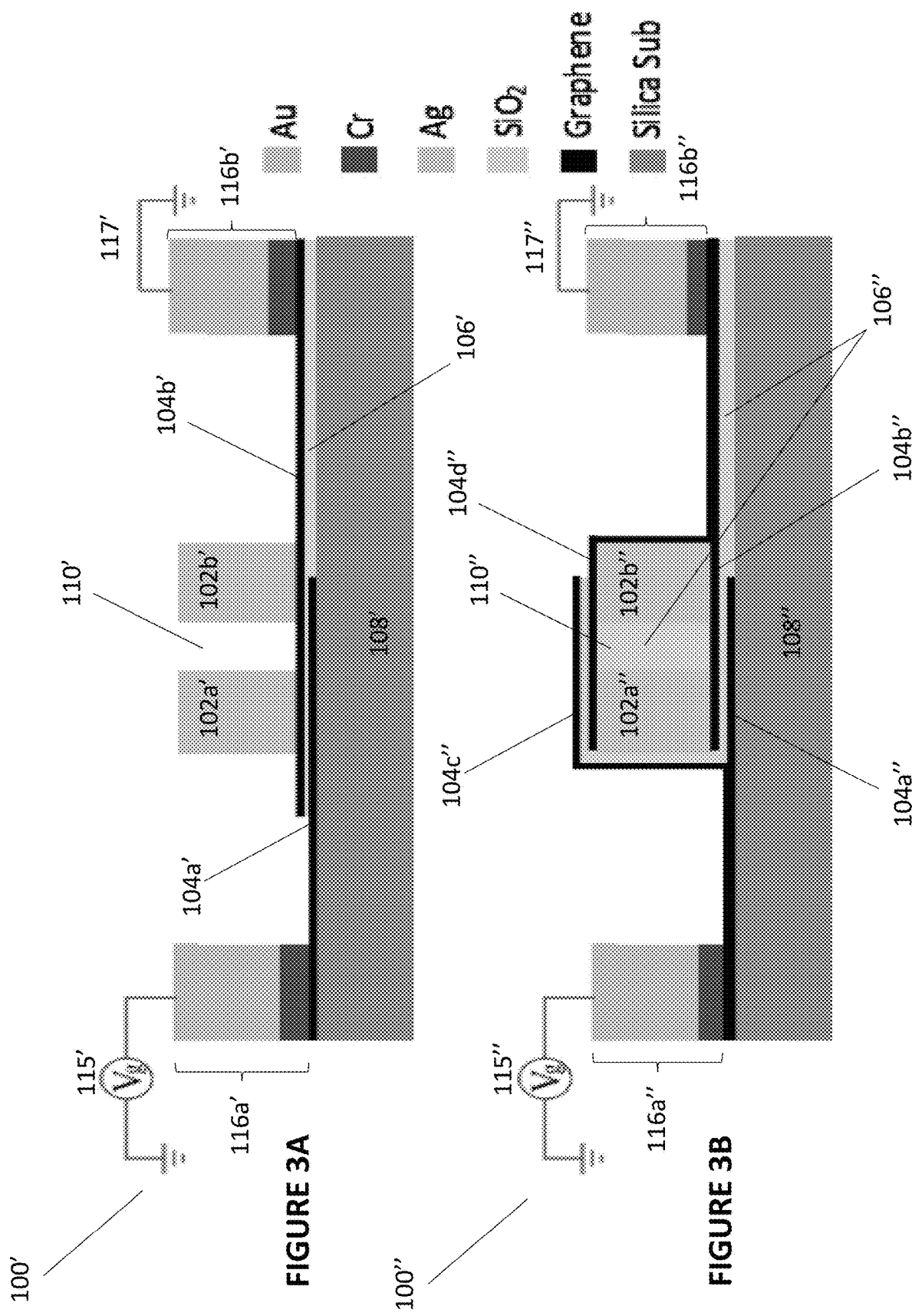

FIGURE 3C

| Graphene Layer | ER (dB/um) | Device Length for 3 dB (um) | Energy/bit (fJ) |
|---|---|---|---|
| 1 | 1.2 | 2.50 | 1.60 |
| 2 | 2.1 | 1.73 | 0.92 |
| 4 | 3.9 | 0.77 | 0.48 |

US 10,663,766 B2

GRAPHENE-BASED PLASMONIC SLOT ELECTRO-OPTICAL MODULATOR

RELATED APPLICATIONS

This application claims the benefit of U.S. Provisional Application No. 62/463,217, filed Feb. 24, 2017, the entire contents of which are incorporated herein by reference.

GOVERNMENT LICENSE RIGHTS

This invention was made with government support under Grant No. FA9550-14-1-0378 awarded by the United States Air Force. The government has certain rights in the invention.

BACKGROUND OF THE INVENTION

Field of the Invention

The present invention relates to electro-optical light modulation. More particularly, the present invention relates to an electro-optical modulator that uses a graphene-based plasmonic slot.

Background of the Related Art

A device performing the electrical-optical conversion, for example an electro-optic modulator (EOM), is an integral building block in photonic integration. The interconnect performance greatly depends on the modulation speed, device foot print and energy consumption of the EOMs used in the photonic integrated circuit (PIC).

The ability to modulate light using 2-dimensional (2D) materials is fundamentally challenged by their small optical cross-section leading to miniscule modal confinements in diffraction-limited photonics despite intrinsically high electro-optic absorption modulation (EAM) potential given by their strong exciton binding energies. However, the inherent polarization anisotropy in 2D-materials and device tradeoffs lead to additional requirements with respect to electric field directions and modal confinement.

Graphene has shown electro-optic response via Pauli-blocking in for near IR frequencies and modulating functionality. Indeed effort has been made in integrating graphene with plasmonics with the purpose of modulation. Yet the anisotropy of 2D films like graphene introduce challenges with respect to polarization alignment. As a result, plasmonic approaches, thus far, have shown low modulation capability and non-synergistic device designs despite graphene's strong index modulation potential. Nevertheless, graphene phase modulation shows tens of GHz fast modulation, however relies on the strong feedback from a mirroring cavity leading to non-compact footprints and temperature sensitivities. Thus a footprint compact, energy efficient high speed graphene electro-optic modulator is needed.

SUMMARY OF THE INVENTION

Accordingly, it is an object of the invention to disclose an electro-optical modulator comprised of a substrate layer, a dielectric spacer, a graphene layer, a first metal block, and a second metal block. Upon application of a voltage across the electro-optical modulator, the graphene layer acts to modulate the plasmonic slot between a light transparent and light absorptive state.

It is another object of the invention to disclose an electro-optical modulator with two or four graphene layers, in which the additional graphene layers reduce the power consumption and length of the modulator.

It is yet another object of the invention to disclose an electro-optical modulator in which the Fermi level of one or more of the graphene layers is selectively tuned to reduce power consumption.

These and other objects of the invention, as well as many of the intended advantages thereof, will become more readily apparent when reference is made to the following description, taken in conjunction with the accompanying drawings.

BRIEF DESCRIPTION OF THE FIGURES

FIG. 1A shows a schematic representation of a single layer graphene plasmonic slot modulator according to an embodiment of the invention;

FIG. 2A shows the performance of presented single layer graphene plasmonic slot modulator in term of extinction ratio, according to an embodiment of the invention;

FIG. 3A shows a schematic representation of a double-layered graphene plasmonic slot modulator, in accordance with an alternate embodiment of the invention;

FIG. 3B shows a schematic representation of a quad-layered graphene plasmonic slot modulator, in accordance with an alternate embodiment of the invention;

FIG. 3C shows a comparative analysis of the performance of the single layer, double layer and four layer exemplary embodiments of the graphene plasmonic slot modulator.

DETAILED DESCRIPTION OF THE PREFERRED EMBODIMENTS

Figure 1B:
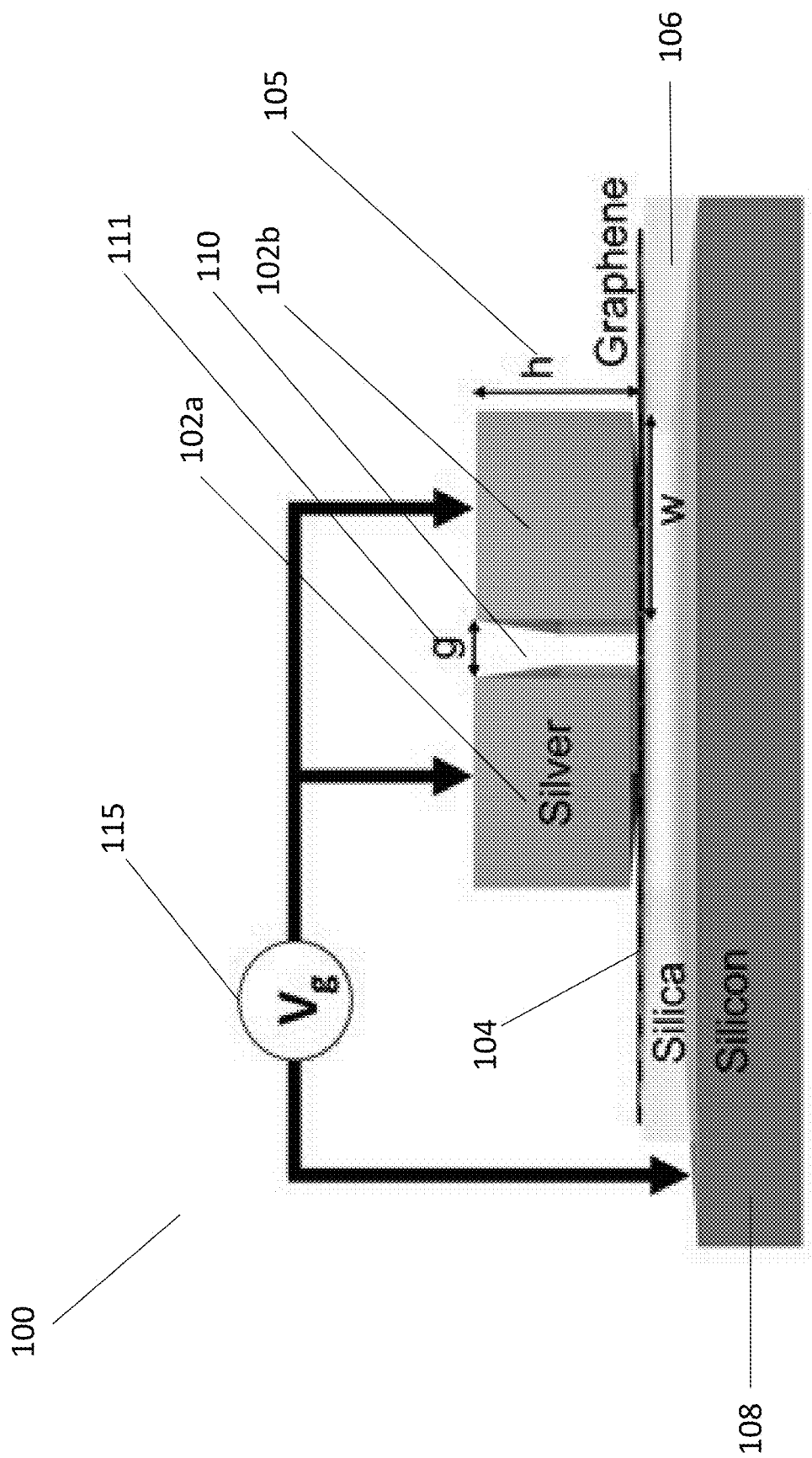
FIG. 1B shows a head-on schematic representation of a single layer graphene plasmonic slot modulator according to an embodiment of the invention.

In describing the illustrative, non-limiting preferred embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

With the small physical dimension of the invention, the graphene plasmonic slot modulator can be densely packed onto photonic integrated circuit for on-chip interconnect with high bit rate communication. Also, for off-chip application, the invention is suitable to be integrated into optical transceiver for chip to chip or end to end communication in high performance computing or data center to achieve higher bandwidth optical communication. Also, the nonlinearity of the proposed electro-optical modulator could be used as the activation function of matrix multiplication in neural networks to help with applications such as deep learning, non-linear optimization, quantum simulation or real-time processing.

Referring now to FIGS. 1A and 1B, a schematic representation of a single layer graphene plasmonic slot modulator 100 is shown according to a non-limiting illustrative embodiment of the invention. The single layer graphene plasmonic slot modulator 100 is has a first metal layer or block 102a and a second metal layer or block 102b, each with a same length 103. In certain embodiments, the first and second metal layers or blocks 102a, 102b may be fabricated by a single lithography and deposition step. The single layer graphene plasmonic slot modulator 100 also has a graphene layer 104 situated under the first metal block 102a and the second metal block 102b. Below the graphene layer 104 is a dielectric spacer 106 that is comprised of silicon dioxide ($SiO_2$), but may also be comprised of dielectric material such as aluminum oxide ($Al_2O_3$), hafnium oxide ($HfO_2$). Below the graphene layer 104 is a substrate layer 108 that forms the base of the single layer graphene plasmonic slot modulator 100. One or more of the single layer graphene plasmonic slot modulators 100 may then be packed onto a photonic integrated circuit or integrated into an optical transceiver.

The first metal block 102a and the second metal block 102b can have an elongated rectangular prism shape with six substantially orthogonal sides or walls, including an inner (longitudinal or lengthwise) side, outer (longitudinal or lengthwise) side, top side, bottom side, distal (transverse or widthwise) end side and proximal (transverse or widthwise) end side. Each side has a respective face or surface, namely a top surface, a bottom surface, an exterior lengthwise surface, an interior lengthwise surface, a distal widthwise side surface, and a proximal widthwise side surface.

The blocks 102a, 102b have a rectangular transverse cross-section and a rectangular longitudinal cross-section. The inner sides of the blocks 102a, 102b each have an inner side surface that faces the respective other inner side surface, to form a gap or slot 110 therebetween. Thus, the slot 110 is substantially parallel and formed between the first metal block 102a and the second metal block 102b. The inner side surfaces of the blocks 102a, 102b are substantially parallel to each other and have a distal end and an opposite proximal end, so that the gap 112 is an elongated slot.

As shown in FIG. 1, light can enter the plasmonic slot 110 at one end (here shown as the distal end) and exit at the other end (here shown as the proximal end). The light can enter substantially perpendicular to the length 103 of the metal blocks 102a, 102b, at "Light In". The light then passes through the plasmonic slot 110 and exits at "Light Out" 114, which is located at the opposite side of the metal blocks 102a, 102b. The first metal block 102a and the second metal block 102b can be made of any suitable metal, but in one embodiment is made of silver but may be also be made of any plasmonic material of telecommunications wavelength including gold, aluminum, and titanium nitride.

The top surface of the first metal block 102a forms the top of the first metal block 102a and does not contact the other elements of the single layer graphene plasmonic slot modulator 100. The bottom surface of the first metal block 102a is on the underside of the first metal block 102a and is in contact with the graphene layer 104. The exterior lengthwise side surface of the first metal block 102a faces outwardly and is opposite the inner lengthwise side surface of the first metal block 102a. The inner lengthwise side surface of the first metal block 102a forms one of the two substantially vertical walls that form the plasmonic slot 110 through which light may travel. The inner lengthwise side surface of the first block 102a faces the inner lengthwise side surface of the second metal block 102b. The distal end surface faces the "Light In" 112, and the proximal end surface faces where light exits the plasmonic slot 110 at "Light Out" 114.

The second metal block 102b is aligned substantially parallel to the first metal block 102a. The top surface of the second metal block 102b forms the top of the second metal block 102b and does not contact the other elements of the single layer graphene plasmonic slot modulator 100. The bottom surface of the second metal block 102b is on the underside of the first metal block 102a and is in contact with the graphene layer 104. The exterior lengthwise side surface of the second metal block 102b faces outwardly and is opposite the inner lengthwise side surface of the second metal block 102b. The inner lengthwise side surface of the second metal block 102b forms one of the two substantially vertical walls that form the plasmonic slot 110 through which light may travel. The inner lengthwise side surface of the second block 102a faces the inner lengthwise side surface of the first metal block 102b. The distal end surface faces the "Light In" 112, and the proximal end surface faces where light exits the plasmonic slot 110 at "Light Out" 114.

The graphene layer 104 is situated against the bottom surfaces of the first and second metal blocks 102a, 102b, such that it is substantially parallel to the bottom surfaces. The graphene layer is constructed as a two-dimensional (2D) lattice, and thus forms a thin flat layer over the spacer 106. The graphene layer 104 is in a hexagonal lattice. Because the graphene used in the graphene layer 104 is a two dimensional material, the tunable permittivity only occurs for its horizontal lattice dimension rather than in the direction perpendicular to it. To do so, the polarization of propagated mode is first taken into account. The graphene structure has a build-in mode confinement with the electrical field in parallel to graphene's lattice dimension (quasi-TE mode), which enables the high light matter interaction of confined optical mode with the active material. Furthermore, the graphene's Fermi level may be tuned or doped through certain processes, for example e-beam lithography or metal deposition, and the modulation power consumption may be further reduced if the graphene Fermi level is selectively engineered to be close to the transition point from the absorptive state to transparent state. Consequently, under certain process condition, the graphene layer can be selectively doped, and thus, the intrinsic Fermi level can be engineered. If the Fermi level of graphene is engineered to be close to the transition point, the modulation voltage needed can be reduced, hence further reducing the overall power consumption for electro-optic modulation. As explained below, the power consumption for electro-optical modulator is $E=\frac{1}{2} CV^2$, where C is the capacitance of the structure which depends on the physical dimension of the device, thickness of the dielectric spacer and dielectric constant of the dielectric material used, V is the voltage needed to be applied for operating this modulator (change of optical transmission between on-off state). Thus by selectively doping the graphene to reduce the voltage needed for the modulator operation, the power consumed E may be reduced.

The dielectric spacer 106 supports the graphene layer 104. The dielectric spacer 106 is comprised of silicon dioxide ($SiO_2$), but may also be comprised of could be made of dielectric material such as aluminum oxide ($Al_2O_3$), hafnium oxide ($HfO_2$). The graphene layer 104 is situated on top of the dielectric spacer 106. The dielectric spacer 106 provides support to the lattice of the graphene layer 104 and ensures that it remains substantially perpendicular to the plasmonic slot 110. The dielectric spacer 106 is optimized to a thickness of 25 nm in order to provide adequate mode confinement for the modulator 100, and thus forms a thin, flat layer. The dielectric spacer layer also serves as a gating oxide for the modulator 100. For capacitively gating graphene to change between its absorptive or transparent state, a capacitor structure is needed. In FIG. 1A, the capacitor is formed between graphene layer 104 and the substrate layer 108, with a dielectric spacer 106 serving as an insulator.

The substrate layer 108 forms the base of the single layer graphene plasmonic slot modulator 100. The substrate layer 108 has a thickness below the cut-off to ensure the light is propagating only alone the plasmonic slot, which at the same time serves as a back gate for capacitively gating graphene. The dimensions of the cut-off are preferably the smallest dimensions for which the structure can support the lowest order of optical mode propagation. This means that below this cut-off dimension, no light would propagate inside the silicon substrate, which is necessary to ensure that the optical mode (energy) only propagates along the plasmonic slot 110, which maximizes the graphene/light interaction. In one embodiment, the substrate layer 108 is comprised of a semiconductor. Exemplary semiconductors that may be used include, but are not limited to Si (silicon), Ge (germanium), InAs (indium arsenide), InGaAs (indium gallium arsenide), and InP (indium phosphide).

The plasmonic slot 110 is designed to (i) provide sub-wavelength plasmonic confinement, which enhances the LMI with the graphene layer 104; (ii) allow the SPP mode to propagate in-plane with graphene layer 104, increasing the confinement factor; and (iii) provide a metal contact, which concurrently serves as an electrical electrode and heat sink at the same time. The metallic plasmonic materials used forming the slot 110 structure are advantageous because they: (1) confine light into smaller dimension without cut-off physical limit; (2) provide a natural heat sink for the device under high speed operation; and (3) naturally provide electrical contact with low resistance, thus lower the RC delay of the modulator 100.

FIG. 1B shows head-on schematic representation of a single plate of a single layer graphene modulator 100, which is comprised of a first and second metal block 102a, 102b, a graphene layer 104, a dielectric spacer 106, and a substrate layer 108. Upon assembly, as described with respect to FIG. 1A, the components form a plasmonic slot 110, with a width of "g." To provide enhanced light-graphene interaction, the plasmonic slot 110 is optimized to have a height of 50 nm and a width of 50 nm. In FIG. 1B, the height is identified as "h" 105 and the width is identified as "g" 111. Herein, "g" 111 may also refer to the air gap in the plasmonic slot 110. Thus, as shown in FIG. 1B, the first lengthwise sides of the first and second metal blocks 102a, 102b is optimized to share this 50 nm height, as they form the walls of the plasmonic slot 110. Similarly, the exposed width of the graphene layer 104, which forms the base of the plasmonic slot is also optimized to 50 nm. When the gate voltage 115, signified by Vg, is applied across the modulator 100, it passes through the first metal block 102a, the second metal block 102b, and the substrate layer 108. The voltage 114 across the plasmonic slot 110 is optimized to confine the electrical field square within the plasmonic slot 110. Light is confined into the plasmonic slot 110 by the structural combination of the first metal block (102a), the plasmonic slot 110, and the second metal block 102b. This results in a quasi-TE-like mode, where the electric field of the propagated light is in plane (parallel) with the underlying graphene layer 104 as it propagates along the slot 110. In other words, the light confinement and the special plasmonic mode of the modulator 100 is due to the structural design and dimensions of the structure in that light prefers to travel inside the slot 110 when the foregoing structural specification are applied.

Figure 4A:
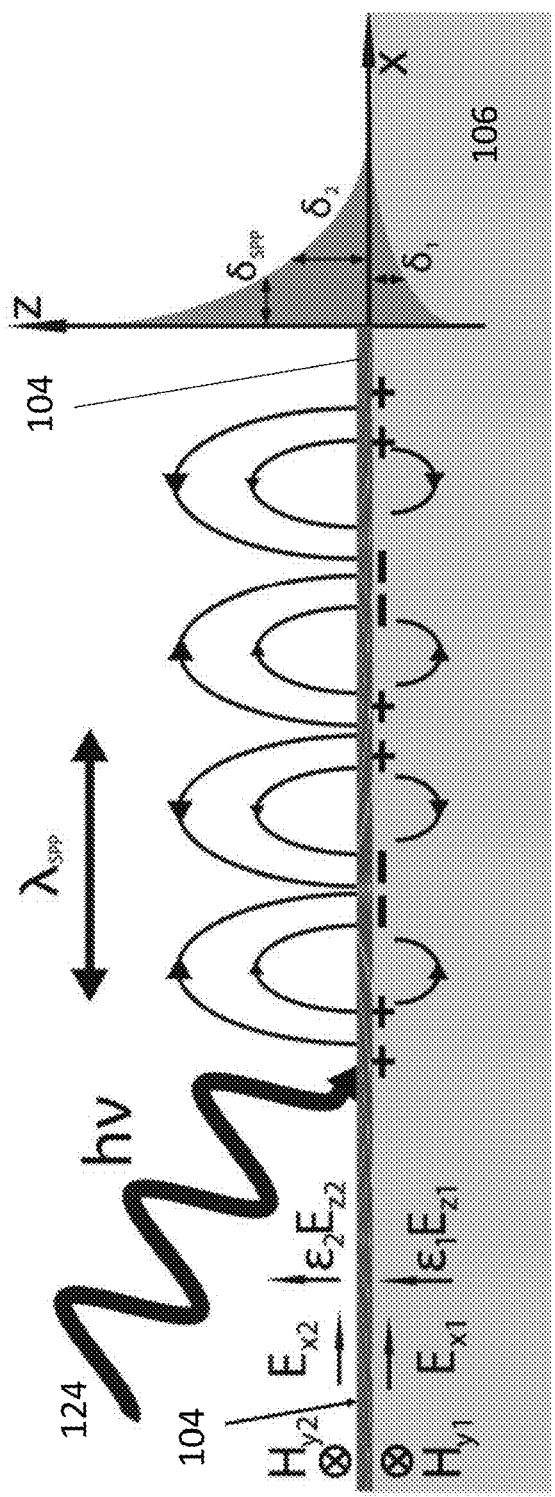
FIG. 4A shows an exemplary plasmonic mode structure where the graphene's refractive index can be only modulated along its lattice plane direction.
Figure 4B:
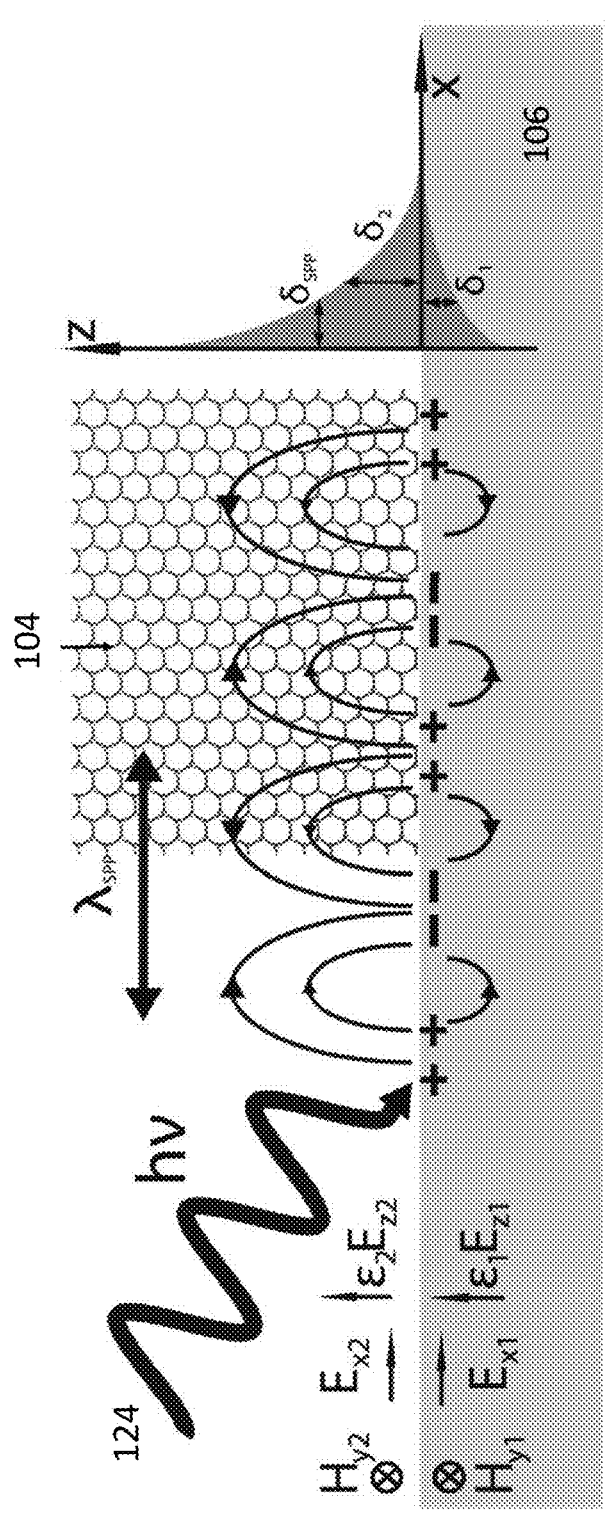
FIG. 4B shows an exemplary plasmonic slot structure where the graphene is in-plane with the electric field enhanced due to surface plasmonic polariton, and the confined mode has better interaction with the graphene close to the metal-dielectric interface.
Figure 4C:
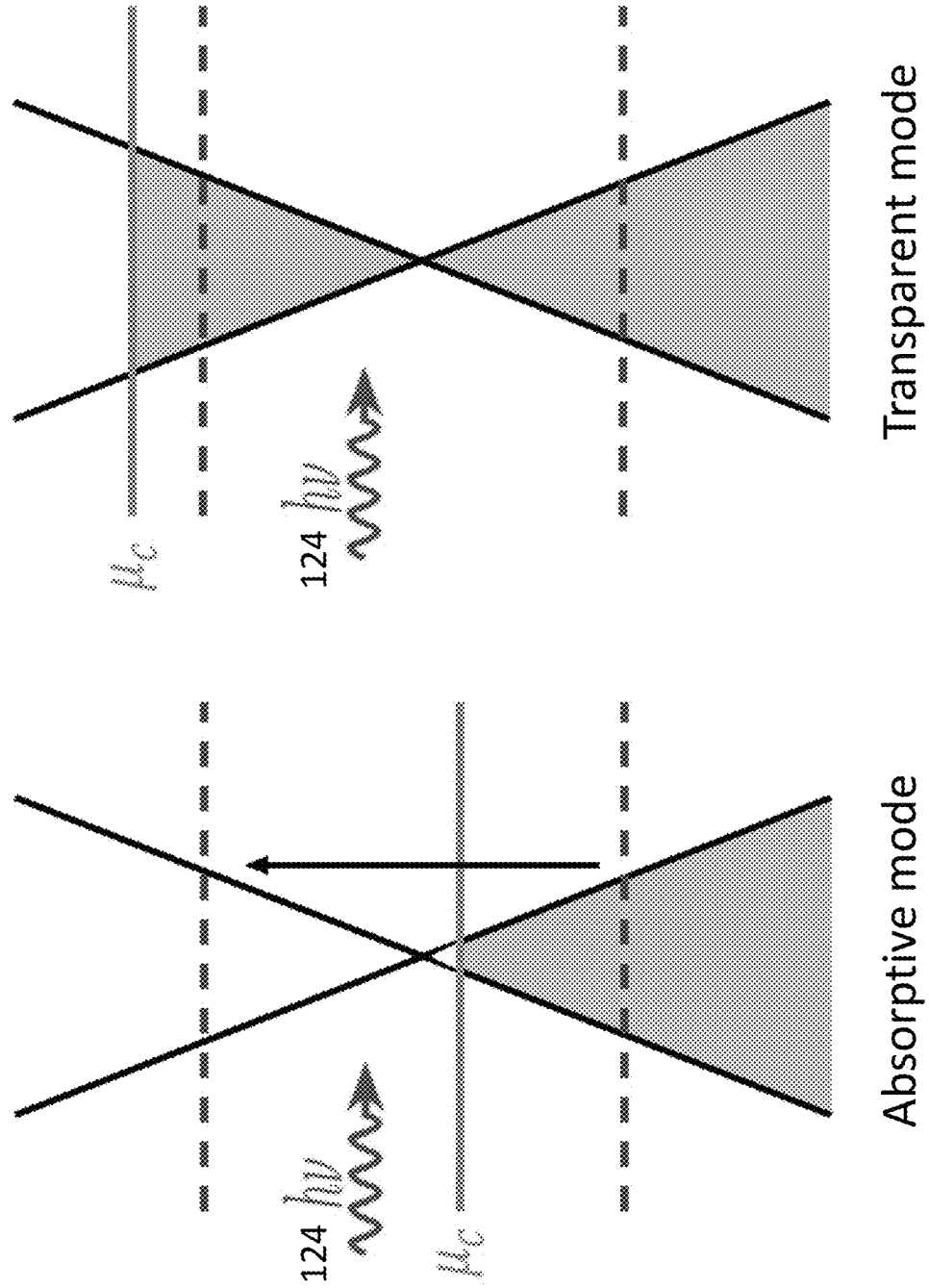
FIG. 4C shows an exemplary mechanism used by the plasmonic slot structure for the absorptive state or transparent state of graphene due to Pauli blocking.

The voltage applied across the graphene/oxide/semiconductor capacitor structure increases the carrier concentration of graphene, thus shifting its Fermi level and changing the material between absorptive or transparent states (FIG. 4C). When voltage is applied, the Fermi level of graphene ($\mu_c$ in FIG. 4C) will be shifted upward above or downward below the ½ of the photon energy level (shown as a dashed line in FIG. 4C, which shows the shift upward above ½ photon energy, where photon energy is hv, and where h is plank constant and v is the frequency of the incoming photon). In that case, due to the mechanism of Pauli-blocking, the incoming photon is no longer absorbed by graphene; thus shifting the modulator 100 to its transparent mode.

Figure 1C:
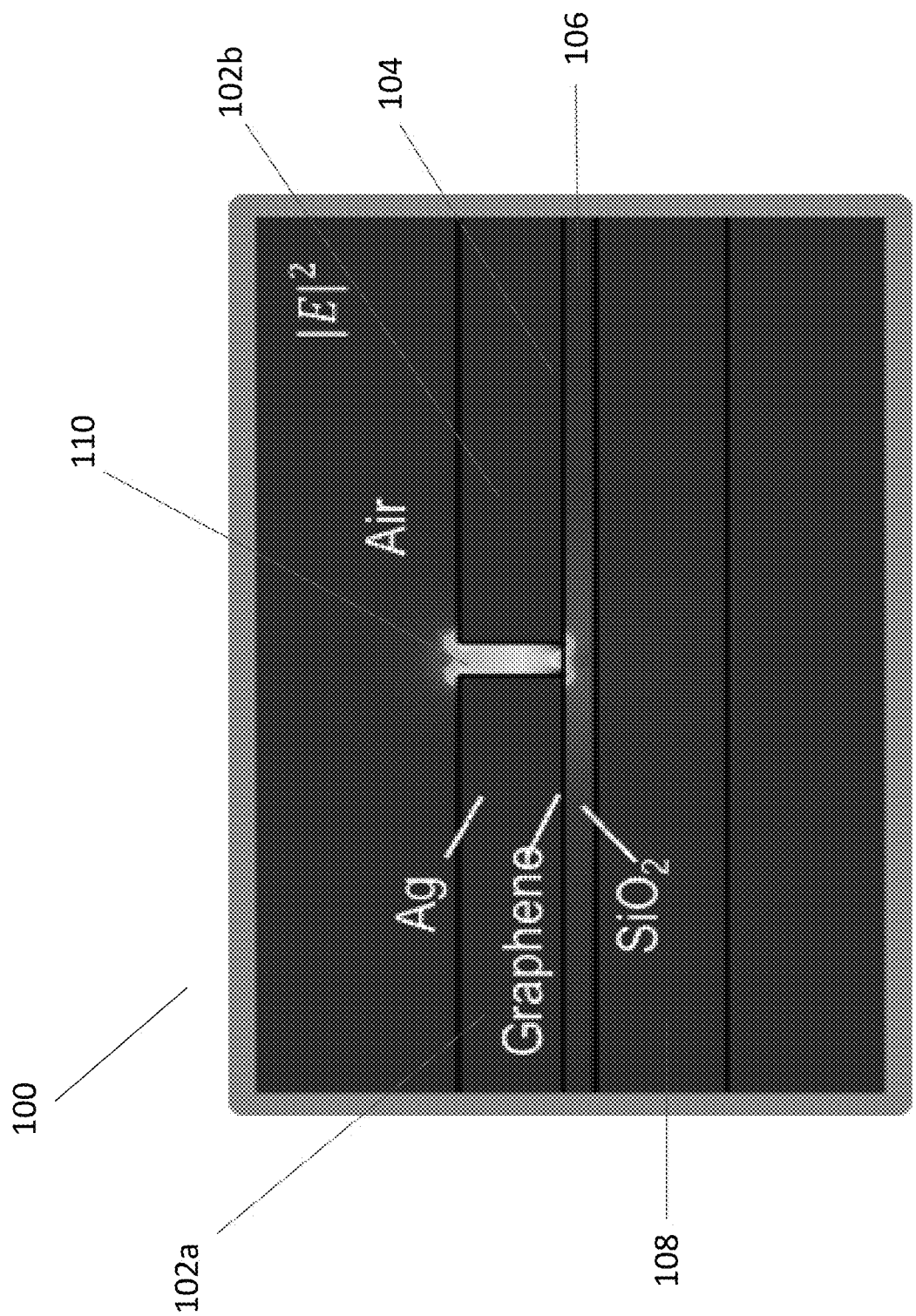
FIG. 1C shows an exemplary optical mode profile of the single layer graphene plasmonic slot structure, where it shows electrical field square (energy of propagating optical mode) is well confined with in the dielectric gap, according to an embodiment of the invention.

FIG. 1C shows an exemplary optical mode profile of the single layer graphene plasmonic slot structure, where it shows electrical field square (energy of propagating optical mode) is well confined with in the plasmonic slot 110. In FIG. 1C, the modulator 100 is shown with the first metal block 102a, the second metal block 102b, the graphene layer 104, a dielectric pacer 106 comprised of silicon dioxide, and a substrate layer 108. The plasmonic slot 110 is shown confining the electrical field square, demonstrating that the energy of the propagating optical mode following application of voltage does not substantially escape the bounds of the plasmonic slot 110.

The electrical energy consumption of the device could be evaluated by capacitive dissipation via $\frac{1}{2}CV^2$, where the gating voltage is calculated from $$|\mu_c| = \hbar v_F \sqrt{\pi \alpha_0 |V_g - V_{Dirac}|} \quad (1)$$

where $v_F=10^6$ m/s is the Fermi velocity of graphene, $a_0=\varepsilon_r\varepsilon_0/de$ is yielded from the simple capacitor model. $V_{Dirac}$ denotes the initial doping level of graphene, which is a finite number ignored for the purposes of this analysis. The bias voltage is calculated as ±2.5 Vpp, then the energy consumption is a function of the capacitance of the whole device. In this exemplary analysis, a 3 µm long device is considered, and the width of the metal slot 110 is calculated from the skin depth of silver. To avoid mode leakage from the metal, 5 times of skin depth is usually chosen to be the metal thickness. By using $$\delta_m = \frac{1}{k_o} \left| \frac{\varepsilon'_m + \varepsilon_d}{\varepsilon'^s_m} \right|^{\frac{1}{2}},$$

the skin depth into silver is around 20 nm, thus the slot width is chosen to be 100 nm. As a consequence, the energy consumption is equal to 400 aJ/bit.

The bandwidth of the modulator 100 can be estimated by $1/(2\pi RC)$, which is constrained by the values of capacitance and resistance which are tightly related to the device dimensions. With the device dimensions disclosed in the presented embodiments, the bandwidth of the graphene plasmonic slot modulator 100 can be more than 100 GHz.

Figure 1D:
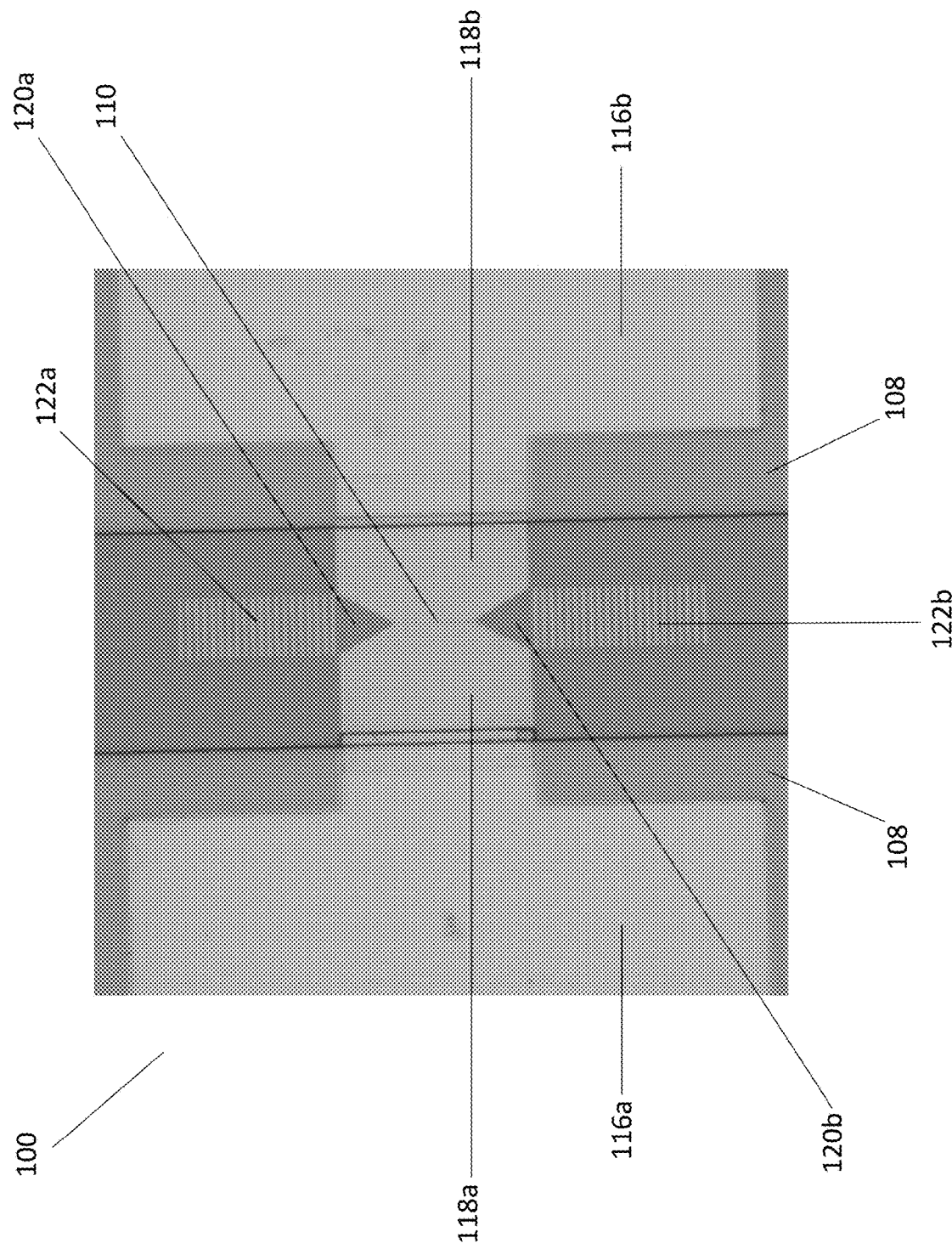
FIG. 1D shows a top view optical microscope image of the single layer graphene plasmonic slot modulator, according to an embodiment of the invention.

FIG. 1D shows a top view optical microscope image of the single layer graphene plasmonic slot modulator 100. FIG. 1D shows a top view of the first and second metal block 102a, 102b, a graphene layer 104, a dielectric spacer 106, a substrate layer 108, and a plasmonic slot 110. FIG. 1D additionally shows a first contact 116a and a second contact 116b. The contacts 116a, 116b are used to pass voltage through the modulator 100 to the blocks 102a, 102b, and graphene layer 104, with the substrate layer 108 gated, such that the modulator 100 switches between an absorptive mode and a transparent mode, as shown in FIG. 4C below. As the first contact 116a and second contact 116b converge towards the plasmonic slot 110, they form a first pad 118a and a second pad 118b, respectively. The pads 118a, 118b press against the first and second metal blocks 102a, 102b (not shown) in order to maintain the dimensions of the plasmonic slot 110. The pads 118a, 118b also electrically connect the first and second contacts 116a 116b to the first metal block 102a and the second metal block 102b as well as the graphene layer 104, which is conductive, underneath. The first and second pads 118a, 118b form a first taper 120a where light enters the plasmonic slot 110 and a second taper 120b where light exits the plasmonic slot 110 in order to properly direct light through the slot 110. These tapers 120a, 120b also provide a lower optical reflection (loss) compared an abrupt dimensional change in structure. Beyond each taper 120a, 120b, a first coupler 122a is situated on the substrate layer 108 where light enters the slot 110, and a second coupler 122b is situated on the substrate layer 108 where light exits the slot 110. The grating couplers 122a, 122b direct light to the respective taper 120a, 120b, where it is then directed into the slot 110.

FIG. 2A the performance of presented single layer graphene plasmonic slot modulator 100 in terms of extinction ratio. FIG. 2A shows the extinction ratio in dB/µm as the air gap width 111 is increased along the y-axis and the height of the metal layers 105 is increased along the x-axis. As shown in FIG. 2A, the extinction ratio is maximized as air gap width and slot height are minimized.

Figure 2B:
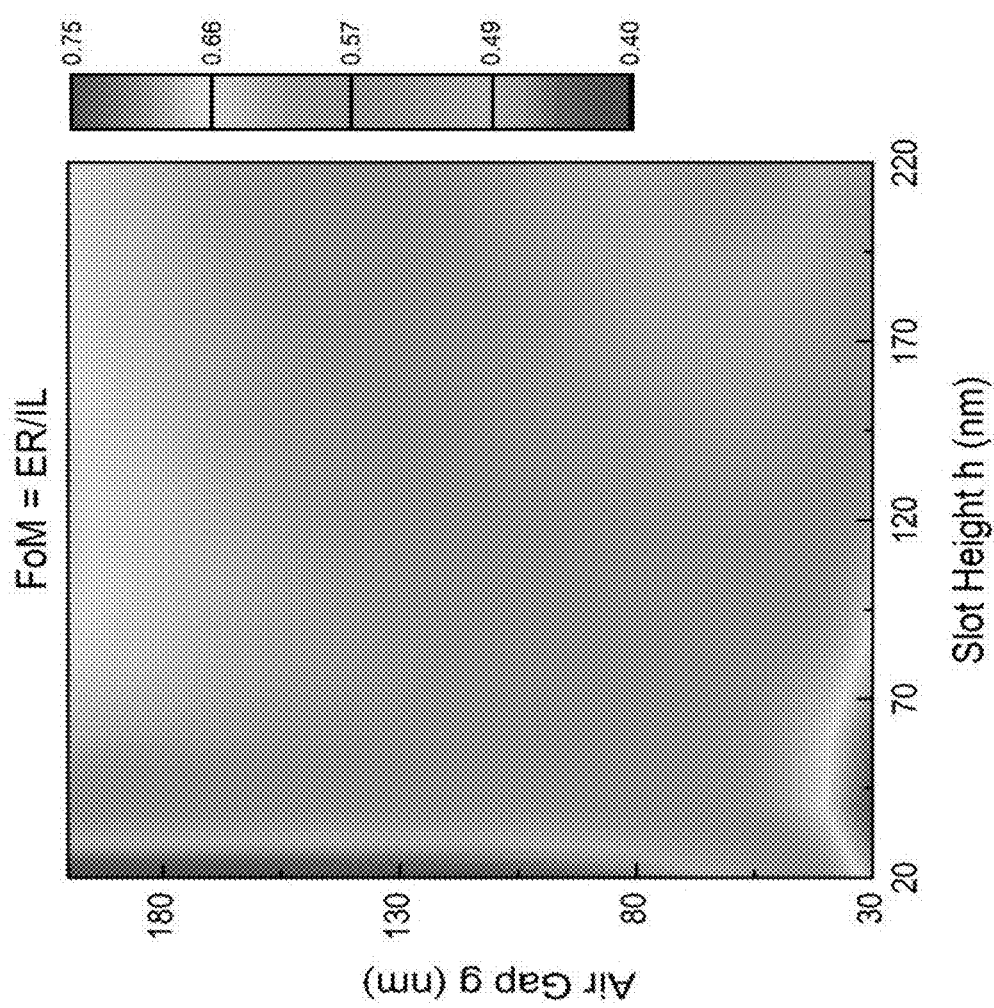
FIG. 2B shows the optimized dimension for this embodiment as a figure of merit based on extinction ratio over insertion loss according to an embodiment of the invention.

FIG. 2B shows the optimized dimension for single layer graphene plasmonic slot modulator 100 the as a figure of merit based on extinction ratio over insertion loss. Figure of merit (FoM) is calculated by dividing the extinction ratio (ER) by insertion loss, the loss in transparent mode during operation (IL). FIG. 2B demonstrates that FoM is maximized as air gap width is minimized and slot height is maintained below approximately 100 nm.

Graphene has a dramatic refractive change when changed in Fermi level; thus it is a favorable material for electro-optic modulation. The use of gold provides a plasmonic mode in near-IR wavelength range, which covers the telecommunication wavelengths of 1310 nm and 1550 nm. Also, by using two gold blocks to form the metal slot, the light is confined inside the slot in a quasi-TE mode (electrical field in-plane with the underlying graphene), thus maximizing graphene/light interaction since the index change of graphene only happens along the direction of its lattice. An advantage of device in FIG. 1A is that since the graphene/light interaction is enhanced, the extinction ratio of the modulator is much higher than that found in the prior art, and as such, only ~3 um device length is needed for a 3 dB modulator, which brings the energy consumption down and increase the modulation bandwidth.

FIG. 3A shows a schematic representation of a double-layered graphene plasmonic slot modulator 100', in accordance with an alternate embodiment of the invention. Substantially similar to the single-layer embodiment 100 disclosed in FIGS. 1A through 1C, the double-layered modulator 100' has a first and a second metal block 102a', 102b' comprised of silver, a dielectric spacer 106' comprised of silicon dioxide (silica) or HfO$_2$, a substrate layer 108' comprised of silicon, a plasmonic slot 110', a first graphene layer 104a' and a second graphene layer 104b'. The first and second graphene layers 104a', 104b' are thin, flat and linear. In addition, the first graphene layer 104a' is substantially parallel to the second graphene layer 104b', with the second graphene layer 104b' extends at least partially over the first graphene layer 140a'. The first and second graphene layers 104a', 104b' are preferably both be at least long enough such that both are underneath the plasmonic slot 110'.

The double-layered modulator also includes a first contact 116a' and a second contact 116b'. The modulator is configured to pass a gate voltage through a first terminal 115' from the first contact 116a' to the second contact 116b', which is connected to a second terminal 117'. The first and second contacts 116a', 116b', are designed with a top layer comprised of gold and a bottom layer of chromium for better adhesion. The bottom layer of the first contact 116a' is situated on and contacts the first graphene layer 104a' of the modulator 100'. The bottom layer of the second contact 116b' is situated on and contacts the second graphene layer 104b' of the modulator 100'.

The first and second metal blocks 102a', 102b' form a plasmonic slot 110' substantially similar to that described with respect to FIGS. 1A through 1C. The first and second metal blocks 102a', 102b' are situated on and contact the second graphene layer 104b', substantially parallel to each other. The second graphene layer 104b' rests on top of and contacts the dielectric spacer 106', while the first graphene layer 104a' is situated below the dielectric spacer 106', such that at least a portion of the dielectric spacer 106' is sandwiched between the first graphene layer 104a' and the second graphene layer 104b'. The first graphene layer 104a' and the second graphene layer 104b' substantially overlap and sandwich the dielectric spacer 106' in the region of the modulator 100' below the first and second metal blocks 102a', 102b', but some part of the first graphene layer 104a' may remain exposed in certain embodiments. Together, the first graphene layer 104a' and the dielectric spacer 106' form a substantially flat base below the bottom layer of the first and second contacts 116a', 116b', which allows the components to rests on the substrate layer 108'.

Accordingly, the first graphene layer 104a' and the spacer 106' are in contact with the substrate layer 108'. The spacer layer 106' is in contact with the substrate layer 108' and extends over at least a portion of the top surface of the first graphene layer 104a' and the first contact 116a' is also on the top surface of the first graphene layer 104a'. The second graphene layer 104b' extends over the top surface of the spacer layer 106'. The blocks 102a', 102b' and the second contact 116b' are on the top surface of the second graphene layer 104b'.

When a gate voltage is passed from the first terminal 115' to the second terminal 117', the modulator 100' enters an "ON" position, referred to as transparent mode in FIG. 4C, and light is allowed is pass through the plasmonic slot 110'. When the voltage no longer passes from the first terminal 115' to the second terminal 117', the modulator 100' enters an "OFF" position, referred to as absorptive mode in FIG. 4C. This "OFF" configuration is optically lossy, while the "ON" configuration is substantially non-lossy. The first graphene layer 104a' and the second graphene layer 104b' with the dielectric spacer 106' in between, together, form a capacitor structure. When gate voltage is applied through the first terminal 115' to the second terminal 117', one layer of graphene is charged. This results in an increase of electron concentration, and shifts its Fermi level beyond the dashed line shown in FIG. 4C. As such, the graphene layer shifts to a transparent state while the other layer of graphene's electrons are depleted, shifting that layer's Fermi level below dashed line in FIG. 4C, thus also shifting it to a transparent state at the same time. Thus, by applying/stopping gating voltage between the two layers of graphene, the modulator may shift from an "on" state (light transparency) to an "off" state (light absorption).

The FIG. 3A embodiment may be favorable to the FIG. 1A embodiment for a number of reasons. For example, by integrating more layers of graphene into the device is favorable because the graphene layers shift from light transparency to absorption simultaneously. As a result, the graphene/light interaction is almost doubled (in the dual-layer FIG. 3A embodiment) or quadrupled (in the quad-layer embodiment of FIG. 3B). This is superior to using one layer of graphene (as shown in FIG. 1A), because with more layers of graphene, the extinction ratio of the device is higher, resulting a smaller device length, while absorbing same amount of light (e.g. during 3 dB modulation, half of the light energy is absorbed). As discussed above, the capacitance of the device depends on the physical dimension of the structure, thus reducing the length of the device and reducing the capacitance. The device bandwidth is $1/(2\pi RC)$, thus, the decrease in capacitance increase the bandwidth (modulation speed). Also, the energy consumption is $E=\frac{1}{2}CV^2$, thus, the decreased capacitance also reduces the energy consumption.

FIG. 3B shows a schematic representation of a quad-layered graphene plasmonic slot modulator 100", in accordance with yet another alternate embodiment of the invention. As with the single-layer embodiment 100 disclosed in FIGS. 1A through 1C, the quad-layered modulator 100" has a first and a second metal block 102a", 102b" comprised of silver, a dielectric spacer 106" comprised of silicon dioxide or HfO$_2$, and a substrate layer 108" comprised of silica. The first and second metal blocks 102a", 102b" form a plasmonic slot 110" substantially similar to that described with respect to FIGS. 1A through 1C. The quad-layered modulator 100" is also comprised of a first contact 116a" and a second contact 116b". The modulator 100" is configured to pass a gate voltage through a first terminal 115" from the first contact 116a" to the second contact 116b", which is connected to a second terminal 117". The first and second contacts 116a", 116b", are designed with a top layer comprised of gold and a bottom layer of chromium. The bottom layer of the first contact 116a" is situated on and contacts the top surface of the first graphene layer 104a" of the modulator 100". The bottom layer of the second contact 116b" is situated on and contacts the top surface of the second graphene layer 104b" of the modulator 100".

The modulator 100" has a first graphene layer 104a", second graphene layer 104b", third graphene layer 104c", and fourth graphene layer 104d". The first and second graphene layers 104a", 104b" are flat, thin and linear, and each extends at least partially under both of the blocks 102a", 102b". The third graphene layer 104c" has a vertical section and a horizontal section. The vertical section orthogonally contacts and connects with the first graphene layer 104a" and extends upward along the outer side of the first block 102a". The horizontal section connects orthogonally to the vertical section and parallel to the first graphene layer 104a", and then extends over the top of at least a portion of the fourth graphene layer 104d" and the first and/or second blocks 102a", 102b".

The fourth graphene layer 104d" also has a vertical section and a horizontal section. The vertical section orthogonally contacts and connects with the second graphene layer 104b" and extends upward along the outer side of the second block 102b". The horizontal section connects orthogonally to the vertical section and parallel to the first and second graphene layers 104a", 104b", and then extends over the top of at least a portion of the first and/or second blocks 102a", 102b", below the horizontal section of the third graphene layer 104c". Accordingly, the first and third graphene layers 104a", 104c" are spaced apart from and do not touch the second and fourth graphene layers 104b", 104d". The first graphene layer 104a" extends in from the left side of the blocks 102a", 102b" and extends above and below the blocks 102a", 102b" to the outside of the second and fourth graphene layers 104b", 104d". And the second graphene layer 104b" extends in from the right side of the blocks 102a", 102b" and extends above and below the blocks 102a", 102b" to the inside of the first and third graphene layers 104a", 104c". Thus, spaces are formed between the horizontal sections of both the third and fourth graphene layers 104c", 104d", between the vertical section of the third graphene layer 104c", between the overlapping portion of the first and second graphene layers 104a", 104b", and in the slot 110". Those spaces can be filled with air or another substance.

In addition, each of the layers 104a", 104b" can each be flat sheets and layers 104c" and 104d" can each be two flat sheets (one for the vertical section and one for the horizontal section). The sheets can be bent to form the vertical and horizontal sections. In one embodiment, the layers 104a" and 104c" are a one-piece unitary member, and the layers 104b", 104d" are a separate one-piece unitary member. The vertical section and horizontal section can extend the entire length of the first and second layers 104a", 104b", or a portion of the length. In one embodiment, the layers 104" (and/or the entire device 100) can be formed by a three-dimensional printer or stamper or classical top-down processing.

A dielectric layer 106" is situated below the second graphene layer 104b" and is sandwiched between the first graphene layer 104a" and the second graphene layer 104b" under the first and second metal blocks 102a", 102b". The second graphene layer 104b" extends under both the first and second metal blocks 102a", 102b".

In certain embodiments of the modulator 100", the dielectric spacer 106" extends around the exterior lengthwise side of the first metal block 102a". In such an embodiment, the vertical section of the fourth graphene layer 104d" wraps around the exterior lengthwise side of the second metal block 102b" and extends to cover the top surface of the second metal block 102b". The fourth graphene layer 104d" then extends across the plasmonic slot 110" between the first and second metal blocks 102a", 102b" and covers the top surface of the first metal block 102a". In such an embodiment, the dielectric spacer 106" extends to cover the fourth graphene layer 104d" that has extended over the top surfaces of the first and second metal blocks 102a", 102b" and the plasmonic slot 110". The third graphene layer 104c" covers the portion of the dielectric spacer 106" that has extended over the top surfaces of the first and second metal blocks 102a", 102b" and the plasmonic slot 110". In certain configurations, the plasmonic slot 110" is filled with the dielectric spacer, but in other configurations, the plasmonic slot 110" is open and does not contain any dielectric material.

Compared to FIG. 3A, FIG. 3B shows an embodiment with two extra layers of graphene 104c", 104d", and as a consequence, it has another pair of graphene/insulator/graphene structures integrated into the structure, which further enhance the overall extinction ratio, reduce the energy consumption, and increase the bandwidth of the structure as previously discussed. Here the reason for the two extra layers of graphene 104c" and 104d" having a vertical section and surrounding the metal blocks 102a", 102b" and the plasmonic slot 110" is that since the light is confined inside the slot 110", for light to 'see' more layers of graphene in order to be absorbed, the graphene layers are preferably placed as close as to where the light is confined. Since the first and second blocks 102a", 102b" are made of metal, there is no way for graphene to be inserted into the slot 110", but the most efficient way is to place graphene layer pairs on top of or at the bottom of the light confined region, the slot 110", to maximize the graphene light interaction and thus increase the extinction, decrease energy consumption, and increase bandwidth.

When a gate voltage is passed from the first terminal 115" to the second terminal 117", the modulator 100' enters an "ON" position, referred to as transparent mode in FIG. 4C, and light is allowed is pass through the plasmonic slot 110". When the voltage no longer passes from the first terminal 115" to the second terminal 117", the modulator 100" enters an "OFF" position, referred to as absorptive mode in FIG. 4C. This "OFF" configuration is optically lossy, while the "ON" configuration is substantially non-lossy. The operating principle is that since the first and third graphene layers 104a", 104c" are in contact with and both connected to the first contact 116a", the first and third graphene layers 104a", 104c" share the same electrical potential, while the second and fourth graphene layers 104b", 104d" are both connected to the second contact 116b" sharing the same electrical potential. Also, similar to FIG. 3A, the first and second graphene layers 104a", 104b" are separated by a dielectric spacer 106" forming a graphene/dielectric/graphene capacitor, while the third and fourth graphene layers 104c", 104d" have another spacer in between on top of the first and second metal blocks 102a", 102b", forming another graphene/dielectric/graphene capacitor. Thus the two pairs of graphene (104a" and 104b"; and 104c" and 104d") work together similarly to the graphene pair in FIG. 3A (104a' and 104b'). When gating voltage is applied through the first terminal 115" to the second terminal 117", the outer graphene sharing the same electrical potential (104a" and 104c") are charged to change the Fermi level, thus changing to a transparent state while the inner two layers of graphene (104b" and 104d"), sharing another electrical potential, are depleted changing their Fermi level and thus also changing to transparent state at the same time. Thus these four layers of graphene are in absorptive state when no voltage applied or in a transparent state when voltage is applied at the same time, hence quadrupling the modulation efficiency (extinction ratio) in comparison to only using one layer of graphene, as disclosed in FIG. 1A.

FIG. 3C shows a comparative analysis of the performance of the single layer, double layer and four layer exemplary embodiments of the graphene plasmonic slot modulator. The first column shows the number of graphene layers used in the modulator, corresponding to the embodiments disclosed herein as FIGS. 1A and 1B (one graphene layer), FIG. 3A (two graphene layers), and FIG. 3B (four graphene layers). The second column shows the extinction ratio, the third column shows device length necessary for the preferred 3 dB of output, and the energy/bit in fJ, where energy/bit is calculated as electrical energy consumption of the device evaluated by capacitive dissipation via $\frac{1}{2}CV^2$. In general, C decreases as the device length decreases. As shown in FIG. 3C, as additional graphene layers are added to the modulator, the extinction ratio is maximized, the device length is minimized, and the energy/bit is minimized. Adding more layers of graphene does not change the voltage needed for modulation, but it does enhance the extinction ratio of the device (in unit dB/length). Thus, for a fixed extinction device (where 3 dB of extinction is used to calculate the form), the device length is shortened, which brings the capacitance down and reduces energy consumption.

FIG. 4A demonstrates that when the graphene layer 104 is incorporated into a plasmonic mode structure, if the graphene layer 104 is sandwiched into the metal dielectric interface 106, when light 124 hits the graphene layer 104, most of the electric field enhanced by plasmonic mode is perpendicular to the graphene lattice plane. This electric field enhancement does not help enhance the light graphene interaction, as the graphene's refractive index can be only modulated along its lattice plane direction.

By contrast, FIG. 4B shows an exemplary plasmonic slot structure where the graphene layer 104 is in-plane with the electric field that is enhanced due to surface plasmonic polaritons, and the confined mode has better interaction with the graphene close to the metal-dielectric interface 106. Because the electric field enhancement occurs in the same plane as the graphene layer 104, along its lattice plane direction. As a result, this design, in accordance with the exemplary embodiments disclosed herein, is superior to that shown in FIG. 4A.

FIG. 4C shows an exemplary mechanism used by the plasmonic slot structure for the absorptive state or transparent state of graphene due to Pauli blocking. FIG. 4C shows light 124 passing through a graphene lattice. The Fermi level of graphene, represented by $\mu_c$, can be selectively tuned, which enables lower power consumption from the modulator when the Fermi level of graphene is tuned to a transition point between absorptive and transparent state. In the absorptive state, the Fermi level of the graphene lattice prevents the passage of light 124. However, when the Fermi level of the graphene is tuned to a transparent mode, the light 214 is able to pass through. It is in this manner that certain embodiments of the invention are able to modulate the transmission of light through the plasmonic slot structure while minimizing power consumption.

Figure 5A:
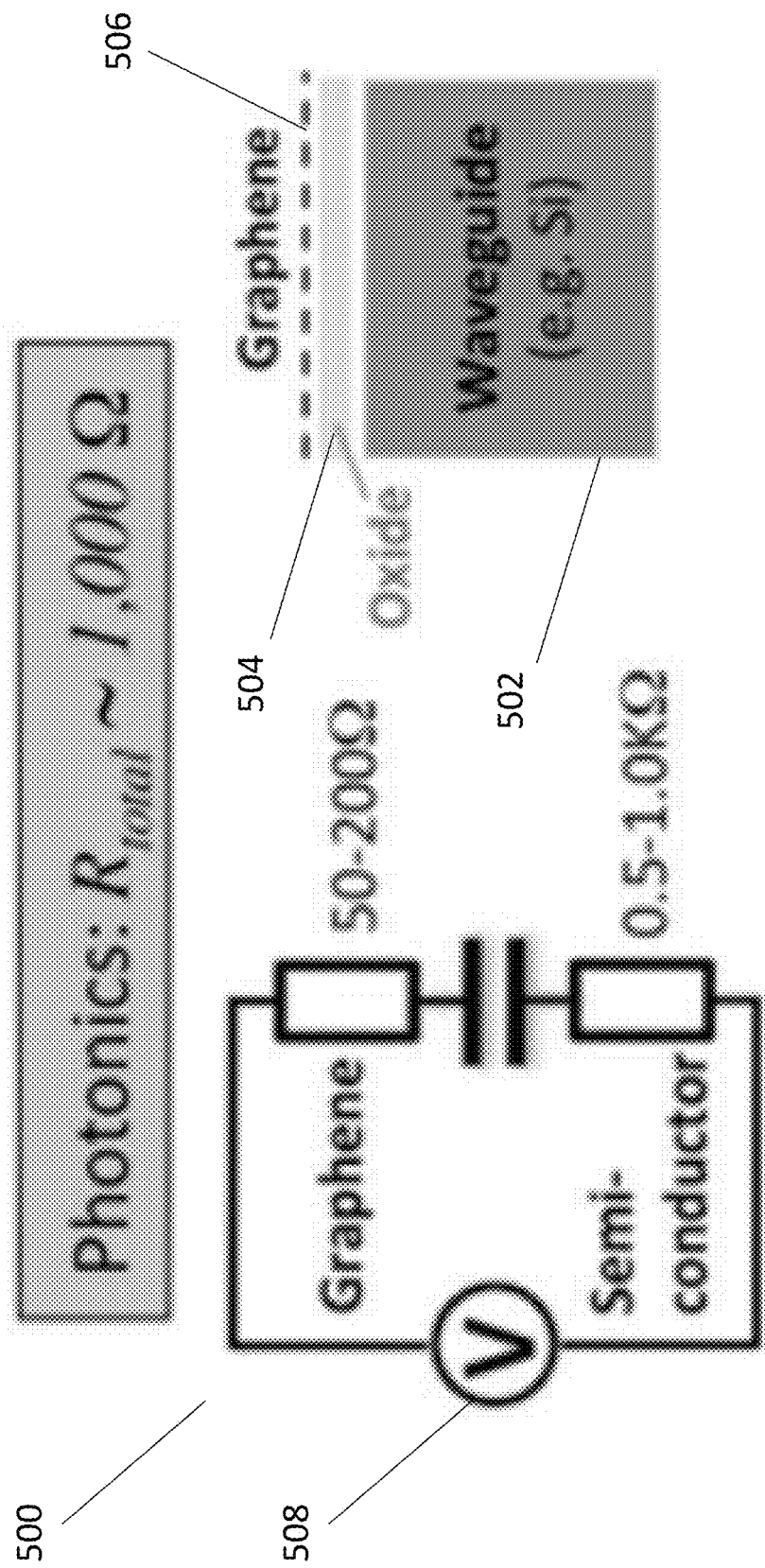
FIG. 5A shows a prior art embodiment in which graphene is integrated into a photonic mode using dielectric material forming the waveguide structure.

FIG. 5A shows a prior art implementation in which graphene is integrated into a photonic mode using dielectric material forming the waveguide structure 500. As shown in FIG. 5A, the waveguide 502, comprised of a semiconductor like silicon, is covered by an oxide layer 504. A graphene layer 506 rests on top of the oxide layer 504. When a voltage 508 is passed across the device 500, in photonic mode, the graphene layer 506 has a resistance of 50-200Ω, while the semiconductor waveguide 502 with its oxide layer 504 has a resistance of 500-1,000Ω. As a result, the total resistance of the device 500 is approximately 1,000Ω. This design results in higher resistance thus decreasing the bandwidth of the modulator due to RC delay compared to the device of the present invention as shown in FIG. 5B.

Figure 5B:
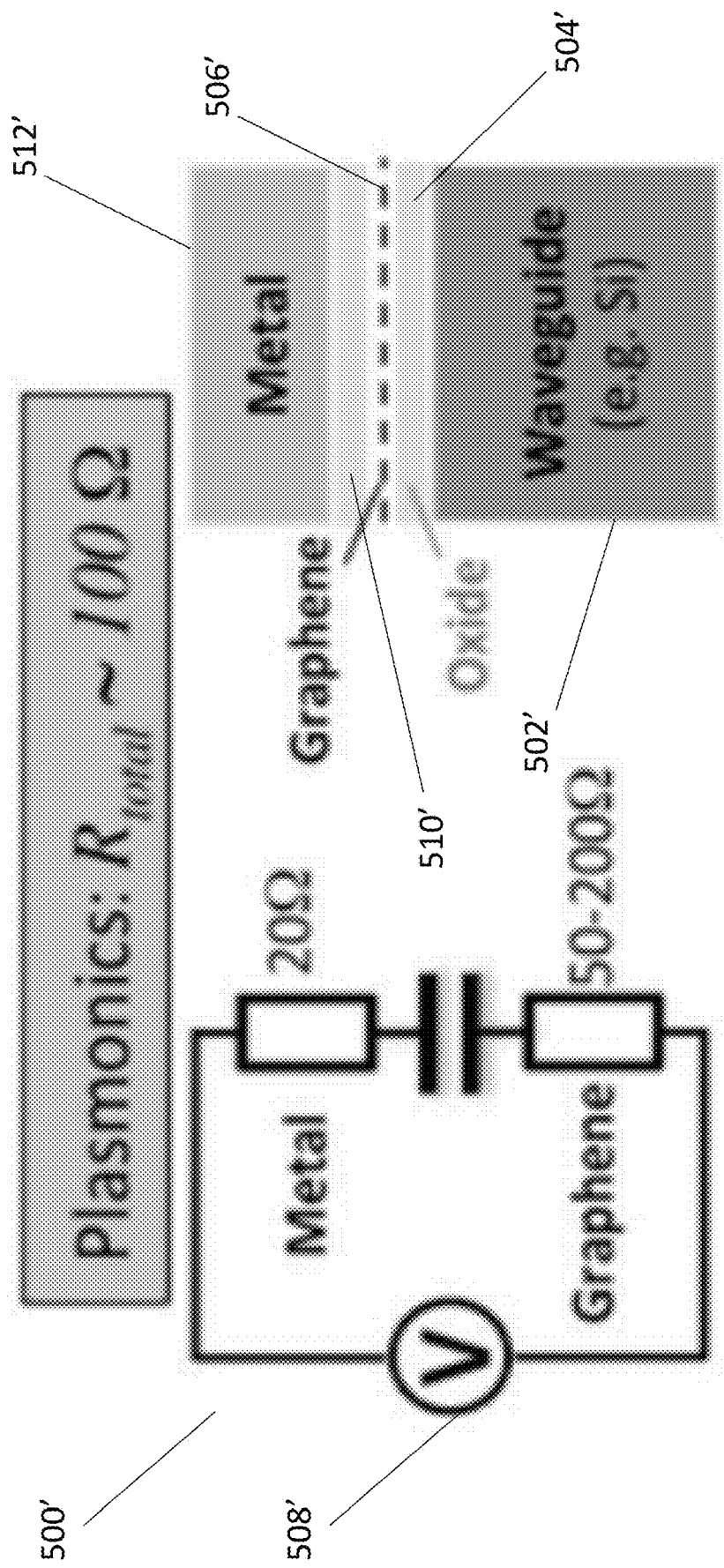
FIG. 5B shows an exemplary plasmonic structure in which the series resistance of the overall device is lower compared to the photonic mode case, which provides a higher modulation speed.

FIG. 5B shows an exemplary plasmonic structure 500' in which the series resistance of the overall device is lower compared to the photonic mode case 500, which provides a higher modulation speed in accordance with an embodiment of the present invention. As shown in FIG. 5B, the waveguide 502', comprised of a semiconductor like silicon, is covered by a first oxide layer 504'. A graphene layer 506' rests on top of the oxide layer 504'. The graphene layer 506' is covered by a second oxide layer 510', such that it is sandwiched between the two oxide layers 504', 510'. A metal layer 512', comprised of silver, rests on top of the second oxide layer 510'.

When a voltage 508' is passed across the device 500' in plasmonic mode, the graphene layer 504' has a resistance of 50-200Ω. However, instead of passing through the semiconductor waveguide 502' with its oxide layer 504' (as in FIG. 5A), the voltage 508' passes through the metal layer 512' (as in FIG. 5B), which has a lower resistance of 50-200Ω. As a result, the total resistance of the device 500' in plasmonic mode is approximately 100Ω, an order of magnitude less than a similar device in photonic mode (that is, 10 times less than FIG. 5A). As a consequence, in comparison to the prior art, device 500' is requires less voltage, and has a reduced delay time for switching between "ON" and "OFF" configurations, which in turn reduces the energy and increases the bandwidth.

Figure 6:
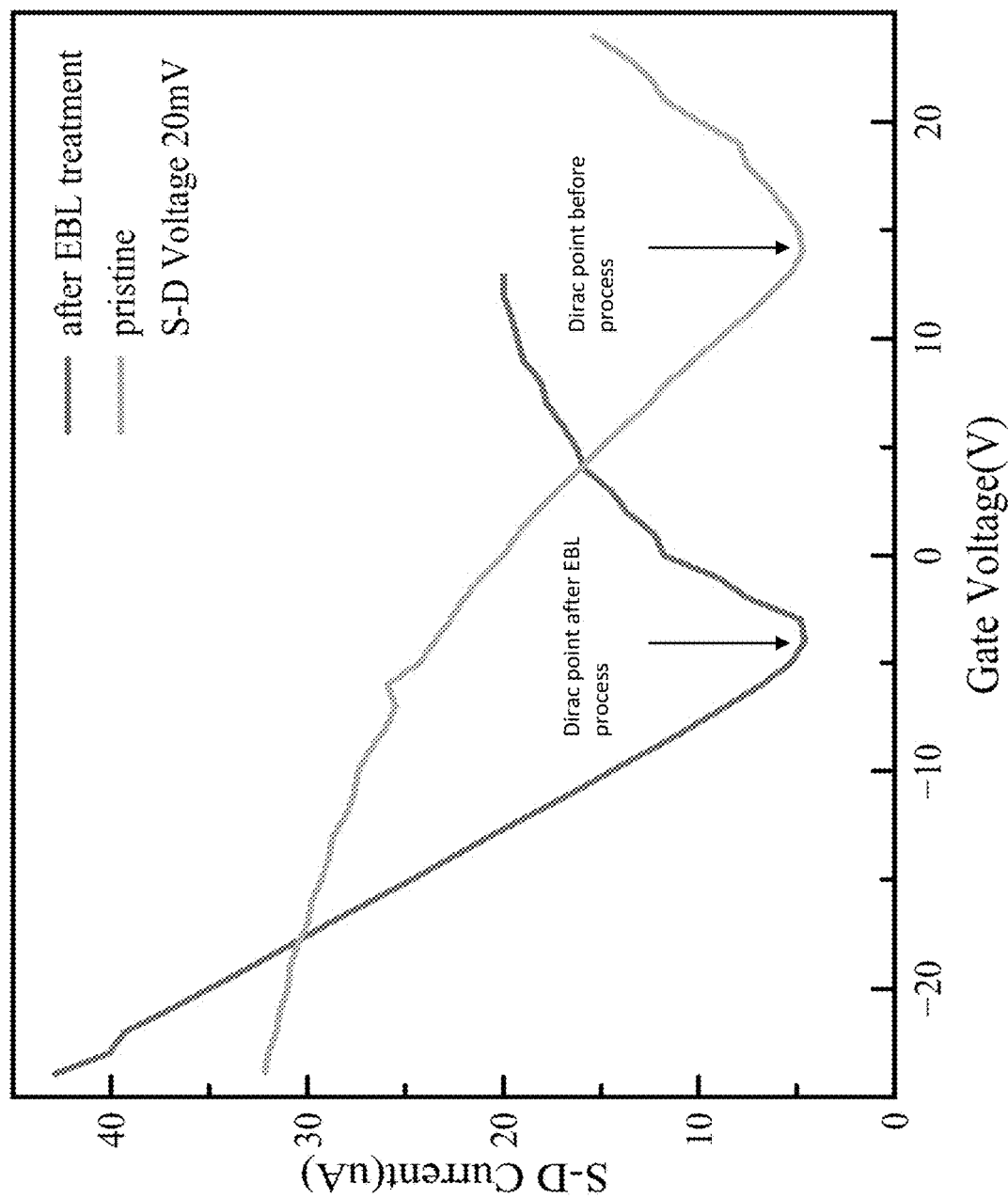
FIG. 6 shows the experimental result of source-drain IV curve of a graphene transistor, demonstrates that before and after e-beam lithography process, the Fermi level of graphene ($\mu_c$ in FIG. 4C) can be selective tuned, which enables lower power consumption of the device when Fermi level of graphene is tuned to the transition point between absorptive and transparent state, and injection a small amount of carriers into graphene layer would change the modulation state of the device.

FIG. 6 shows the experimental result of source-drain IV curve of a graphene transistor in accordance with an embodiment of the invention. The graph of FIG. 6 shows the Dirac point for the graphene lattice of the present invention before and after it has been processed by e-beam lithography (EBL). In this process, the graphene lattice is exposed to an electron beam. The y-axis of the graph shows the Source-Drain (SD) current in µA that passes through the graphene layer. The x-axis represents the gate voltage in V. As shown herein, the Fermi level of graphene ($\mu_c$ in FIG. 4C) can be selective tuned, which enables lower power consumption of the device when Fermi level of graphene is tuned to the transition point between absorptive and transparent state, and injection a small amount of carriers into graphene layer would change the modulation state of the device. Before the e-beam lithography (EBL) process, the graphene has a Dirac point of approximately 15 V. However, after the Fermi level of the graphene has been selectively tuned using the EBL process, that Dirac point drops to approximately −4 V. By selectively tuning the graphene lattice, power consumption of the modulators disclosed may be reduced.

It is noted that the description uses several geometric or relational terms, such as prism, rectangular, square, tapered, parallel, perpendicular, orthogonal, thin, and flat. In addition, the description uses several directional or positioning terms and the like, such as vertical, horizontal, top, bottom, left, right, up, down, inner, outer, distal, and proximal. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. For instance, walls may not be exactly perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the invention.

The foregoing description and drawings should be considered as illustrative only of the principles of the invention. The invention may be configured in a variety of shapes and sizes and is not intended to be limited by the preferred embodiment. For example, the graphene layer can be any suitable size, but in one embodiment has a thickness of 0.35 nm. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. An electro-optical modulator comprised of:
   a substrate layer;
   a first contact and a second contact disposed on the substrate layer;
   a dielectric spacer disposed on the substrate layer;
   a first graphene layer disposed on the dielectric spacer, said first graphene layer being planar and forming a graphene plane and having a graphene structure that creates an electric field substantially parallel to the graphene plane;
   a first metal layer and a second metal layer disposed on the first graphene layer, forming a plasmonic slot therebetween, whereby the electric field propagates along the plasmonic slot and confines light within the plasmonic slot;
   wherein a gating voltage is applied across the dielectric spacer and the first graphene layer controls the plasmonic slot to modulate between a state of light absorption and a state of light transparency.

2. The electro-optical modulator of claim 1, wherein said graphene structure creates the electric field that enhance the light-matter-interactions by a surface plasmonic polaritons.

3. The electro-optical modulator of claim 1, wherein the modulator is comprised of a second graphene layer disposed above the first graphene layer, such that at least a portion of the dielectric spacer is sandwiched between the first graphene layer and the second graphene layer.

4. The electro-optical modulator of claim 3, where the modulator is comprised of a third graphene layer and a fourth graphene layer, wherein the first graphene layer, the second graphene layer, the third graphene layer, and the fourth graphene layer enclose the first metal layer, the second metal layer, and the plasmonic slot, wherein the dielectric spacer comprises a first dielectric spacer, and further comprising a second dielectric spacer, at least a portion of said second dielectric spacer between the second graphene layer and the third graphene layer and a third dielectric spacer, at least a portion of said third dielectric spacer between the third graphene layer and the fourth graphene layer.

5. The electro-optical modulator of claim 4, wherein the first contact and the second contact are each comprised of a top layer of a conductive metal and a bottom adhesive layer comprised of chromium.

6. The electro-optical modulator of claim 1, wherein the plasmonic slot has a height of 50-100 nm and a width of 50-100 nm.

7. The electro-optical modulator of claim 1, wherein the first graphene layer has a selectively tuned Fermi level, and said gating voltage controls energy of the Fermi level of said first graphene layer to place said first graphene layer in the state of light absorption or the state of light transparency.

8. The electro-optical modulator of claim 1, wherein the dielectric spacer is comprised of silicon dioxide ($SiO_2$), aluminum oxide ($Al_2O_3$), or hafnium oxide ($HfO_2$).

9. The electro-optical modulator of claim 1, wherein the first metal layer and the second layer are metal blocks fabricated by a single lithography and deposition step.

10. The electro-optical modulatory of claim 1, wherein said first contact and second contact are deposited on a top surface of the substrate layer, said dielectric spacer is deposited on a top surface of the substrate layer, said first graphene layer is deposited on a top surface of the dielectric spacer, and said first metal layer and second metal layer are deposited on a top surface of the first graphene layer, forming a plasmonic slot.

11. The electro-optical modulator of claim 1, wherein the substrate layer is comprised of Si, Ge, InAs, InGaAs, or InP.

12. An electro-optical modulator comprising:
    a substrate;
    a first graphene layer positioned on the substrate and having a first contact;
    a first dielectric spacer positioned on the first graphene layer;
    a second graphene layer positioned on the first dielectric spacer spaced from the first graphene layer with at least a portion of the first dielectric spacer positioned between the first and second graphene layers, said second graphene layer having a second contact;
    a first block and a second block positioned on the second graphene layer and having an optical waveguide slot therebetween; and
    a voltage source providing a gating voltage applied across the first contact and the second contact to control the first and second graphene layers to select between an absorptive state and a transparent state to control an optical signal passing through the optical waveguide slot.

13. The modulator of claim 12, further comprising:
    a second dielectric spacer positioned on the second graphene layer;
    a third graphene layer positioned on the second dielectric spacer and coupled to the first graphene layer and extending over a top of the first and/or second block, with at least a portion of the second dielectric spacer positioned between the second and third graphene layers; a third dielectric spacer positioned on the third graphene layer; and
    a fourth graphene layer positioned on the third dielectric spacer and coupled to the second graphene layer and extending over the top of the first and/or second block, with at least a portion of the third dielectric spacer positioned between the third and fourth graphene layers.

14. The modulator of claim 13, wherein the third graphene layer extends over at least a portion of the fourth graphene layer to form a graphene-dielectric-graphene stack cover the plasmonic slot.

15. The modulator of claim 1, wherein light passing through the plasmonic slot is has a wavelength within the telecommunication band.

16. The modulator of claim 15, wherein the wavelength is 1310 nm or 1550 nm.

17. The modulator of claim 1, wherein the graphene structure comprises a lattice.

18. The modulator of claim 1, wherein the graphene structure comprise a hexagonal lattice.

19. The modulator of claim 4, wherein the first, second, third and fourth graphene layers each have a thickness of one atom.

20. The modulator of claim 12, further comprising reducing the gating voltage needed for modulating between the transparent state and the absorptive state by selectively tuning the Fermi level of the graphene layers to reduce power consumption of said modulator, and whereby said gating voltage controls energy of a Fermi level of said first and second graphene layers to position said first and second graphene layers in the absorptive state or the transparent state.

* * * * *